(12) United States Patent  (10) Patent No.: US 8,140,406 B2
Myers et al.  (45) Date of Patent: Mar. 20, 2012

(54) PERSONAL DATA SUBMISSION WITH OPTIONS TO PURCHASE OR HOLD ITEM AT USER SELECTED PRICE

(76) Inventors: Jerome Myers, Douglasville, GA (US); Rimas (Ray) Rauba, Roswell, GA (US); John P. Ruckart, Atlanta, GA (US)

( * ) Notice: Subject to any disclaimer, the term of this patent is extended or adjusted under 35 U.S.C. 154(b) by 1208 days.

(21) Appl. No.: 11/624,360

(22) Filed: Jan. 18, 2007
(Under 37 CFR 1.47)

(65) Prior Publication Data

US 2009/0030847 A1  Jan. 29, 2009

(51) Int. Cl.
*G06Q 30/00* (2006.01)
(52) U.S. Cl. .................. 705/26.4; 705/26.1; 705/26.61
(58) Field of Classification Search .............. 705/26, 705/27, 26.1, 26.4, 26.61
See application file for complete search history.

(56) References Cited

U.S. PATENT DOCUMENTS

| | | | |
|---|---|---|---|
| 5,418,354 A | 5/1995 | Halling et al. | |
| 5,732,074 A | 3/1998 | Spaur et al. | |
| 5,887,271 A | 3/1999 | Powell | |
| 5,913,210 A | 6/1999 | Call | |
| 5,938,727 A | 8/1999 | Ikeda | |
| 5,950,173 A | 9/1999 | Perkowski | |
| 5,971,277 A | 10/1999 | Cragun et al. | |
| 5,992,752 A | 11/1999 | Wilz, Sr. et al. | |
| 6,064,981 A * | 5/2000 | Barni et al. | 705/26 |
| 6,092,035 A | 7/2000 | Kurachi et al. | |
| 6,101,483 A | 8/2000 | Petrovich et al. | |
| 6,134,548 A | 10/2000 | Gottsman et al. | |
| 6,134,578 A | 10/2000 | Ehlig et al. | |
| 6,317,718 B1 | 11/2001 | Fano | |
| 6,356,905 B1 | 3/2002 | Gershman | |
| 6,397,212 B1 | 5/2002 | Biffar | |
| 6,446,871 B1 | 9/2002 | Buckley et al. | |
| 6,604,681 B1 | 8/2003 | Burke et al. | |
| 6,625,581 B1 | 9/2003 | Perkowski | |
| 6,641,037 B2 | 11/2003 | Williams | |
| 6,704,716 B1 * | 3/2004 | Force | 705/80 |
| 6,796,507 B2 | 9/2004 | Bean et al. | |
| 6,814,282 B2 | 11/2004 | Seifert et al. | |
| 6,871,198 B2 | 3/2005 | Neal et al. | |
| 7,040,541 B2 | 5/2006 | Swartz et al. | |
| 7,062,491 B2 | 6/2006 | McNulty et al. | |
| 7,063,263 B2 | 6/2006 | Swartz et al. | |
| 7,092,943 B2 | 8/2006 | Roese et al. | |
| 7,139,728 B2 | 11/2006 | Rigole | |
| 7,185,818 B2 | 3/2007 | Salvato | |
| 7,200,566 B1 * | 4/2007 | Moore et al. | 705/26 |

(Continued)

OTHER PUBLICATIONS

"Tips to Negotiate Your Next Software Contract," Corporate EFT Report, vol. 15, No. 24.*

(Continued)

*Primary Examiner* — Amee A Shah
(74) *Attorney, Agent, or Firm* — Thomas, Kayden, Horstemeyer & Risley, LLP

(57) ABSTRACT

At least one embodiment of a method includes receiving data related to an item, the item being associated with a listed price and receiving data related to a user requested price for the item. Some embodiments include determining whether a first seller accepts the user requested price for the item and in response to a determination that the first seller accepts the user requested price, sending an offer to the user to purchase the item at the user requested price.

17 Claims, 16 Drawing Sheets

U.S. PATENT DOCUMENTS

| | | | |
|---|---|---|---|
| 7,296,001 B1 * | 11/2007 | Ephrati et al. | 705/37 |
| 2001/0049632 A1 | 12/2001 | Rigole | |
| 2001/0056359 A1 | 12/2001 | Abreu | |
| 2002/0001372 A1 | 1/2002 | Katz | |
| 2002/0007322 A1 | 1/2002 | Stromberg | |
| 2002/0035501 A1 | 3/2002 | Handel | |
| 2002/0079368 A1 | 6/2002 | Hankins | |
| 2002/0087522 A1 | 7/2002 | MacGregor et al. | |
| 2002/0103740 A1 * | 8/2002 | Maroney | 705/37 |
| 2002/0107756 A1 | 8/2002 | Hammons | |
| 2002/0120519 A1 | 8/2002 | Martin | |
| 2002/0138331 A1 | 9/2002 | Hosea | |
| 2002/0194081 A1 | 12/2002 | Perkowski | |
| 2003/0004821 A1 | 1/2003 | Dutta et al. | |
| 2003/0041098 A1 | 2/2003 | Lortz | |
| 2003/0061202 A1 | 3/2003 | Coleman | |
| 2003/0065636 A1 | 4/2003 | Peyrelevade | |
| 2003/0078929 A1 | 4/2003 | McNulty et al. | |
| 2003/0132298 A1 | 7/2003 | Swartz et al. | |
| 2003/0164819 A1 | 9/2003 | Waibel | |
| 2003/0229552 A1 * | 12/2003 | Lebaric et al. | 705/35 |
| 2004/0060986 A1 | 4/2004 | Bean et al. | |
| 2004/0104271 A1 | 6/2004 | Martucci et al. | |
| 2004/0210479 A1 | 10/2004 | Perkowski | |
| 2005/0010475 A1 | 1/2005 | Perkowski | |
| 2005/0055281 A1 * | 3/2005 | Williams | 705/26 |
| 2005/0119980 A1 * | 6/2005 | Kohavi et al. | 705/80 |
| 2005/0160004 A1 | 7/2005 | Moss et al. | |
| 2005/0187967 A1 | 8/2005 | Couch et al. | |
| 2005/0203727 A1 | 9/2005 | Heiner et al. | |
| 2005/0251641 A1 | 11/2005 | Camilli et al. | |
| 2006/0015435 A1 * | 1/2006 | Nathanson | 705/37 |
| 2006/0047615 A1 | 3/2006 | Raven | |
| 2006/0149653 A1 * | 7/2006 | Davis et al. | 705/37 |
| 2006/0200480 A1 | 9/2006 | Harris et al. | |
| 2006/0237532 A1 | 10/2006 | Scott-Ieikach | |
| 2006/0248554 A1 * | 11/2006 | Priddy | 725/25 |
| 2008/0021810 A1 * | 1/2008 | Pappas et al. | 705/37 |
| 2008/0071692 A1 * | 3/2008 | Jain | 705/80 |
| 2008/0147534 A1 * | 6/2008 | Ephrati et al. | 705/37 |
| 2009/0254971 A1 * | 10/2009 | Herz et al. | 726/1 |

OTHER PUBLICATIONS

Starr; U.S. Appl. No. 11/304,338, filed Dec. 15, 2005.
Starr; U.S. Appl. No. 11/304,036, filed Dec. 15, 2005.
Starr; Non- Final Rejection mailed Dec. 21, 2007; U.S. Appl. No. 11/304,036, filed Dec. 15, 2005.
Starr; Non-final rejection mailed Jan. 20, 2010 for U.S. Appl. No. 11/304,338, filed Dec. 15, 2005.
Starr; Non-Final Rejection mailed Mar. 4, 2009 for U.S. Appl. No. 11/304,338, filed Dec. 15, 2005.
Starr; Non-Final Rejection mailed Apr. 27, 2009 for U.S. Appl. No. 11/304,036, filed Dec. 15, 2005.
Starr; Final Office Action mailed May 26, 2010 for U.S. Appl. No. 11/304,338, filed Dec. 15, 2005.
Starr; Non-Final Rejection mailed May 22, 2008 for U.S. Appl. No. 11/304,338, filed Dec. 15, 2005.
Starr; Interview Summary mailed Jun. 9, 2009 for U.S. Appl. No. 11/304,338, filed Dec. 15, 2005.
Starr; Non-Final Office Action mailed Jul. 7, 2010 for U.S. Appl. No. 11/304,036, filed Dec. 15, 2005.
Starr; Final Office Action mailed Sep. 14, 2009 for U.S. Appl. No. 11/304,338, filed Dec. 15, 2005.
Starr; Final Rejection mailed Oct. 24, 2008 for U.S. Appl. No. 11/304,338, filed Dec. 15, 2005.
Starr; Final Rejection mailed Oct. 15, 2008 for U.S. Appl. No. 11/304,036, filed Dec. 15, 2005.
Starr; Final Office Action mailed Nov. 6, 2009 for U.S. Appl. No. 11/304,036, filed Dec. 15, 2005.
Starr; Final Office Action mailed Dec. 3, 2010 for U.S. Appl. No. 11/304,036, filed Dec. 15, 2005.
Starr; Non-Final Office Action mailed May 4, 2011 for U.S. Appl. No. 11/304,036, filed Dec. 15, 2005.

* cited by examiner

PERSONAL DATA SUBMISSION WITH OPTIONS TO PURCHASE OR HOLD ITEM AT USER SELECTED PRICE

CROSS REFERENCE

This application incorporates by reference, in its entirety, U.S. application Ser. No. 11/304,036, entitled "User Access to Item Information," filed Dec. 15, 2005. This application also incorporates by reference, in its entirety, U.S. application Ser. No. 11/308,338, entitled "Network Access to Item Information, also filed Dec. 15, 2005.

BACKGROUND

When searching for goods and services, consumers often desire to find the lowest price. While many stores offer the same or similar goods and services, many consumers may often not be willing to pay the price advertised by the seller. Similarly, sellers may oftentimes offer goods and/or services to customers at a certain price. The seller, however, may not know a price that would entice the largest number of consumers to purchase the goods and/or services, and thereby yield the largest amount of revenue. While sellers may advertise via newspapers, radio, and television regarding sales and reduced prices, the seller generally has no way to determine the effectiveness and/or whether the sale price could have been lower or higher to maximize revenue.

Thus, a heretofore unaddressed need exists in the industry to address the aforementioned deficiencies and inadequacies.

SUMMARY

Included are systems and methods for personal data submission. At least one embodiment of a method includes receiving data related to an item, the item being associated with a listed price and receiving data related to a user requested price for the item. Some embodiments include determining whether a first seller accepts the user requested price for the item and in response to a determination that the first seller accepts the user requested price, sending an offer to the user to purchase the item at the user requested price.

Also included are systems for personal data submission. At least one embodiment of a system includes a first receiving component configured to receive data related to an item, the item being associated with a listed price and a second receiving component configured to receive data related to a user requested price for the item. Some embodiments include a first determining component configured to determine whether a first seller accepts the user requested price for the item and a sending component, configured to, in response to a determination that the first seller accepts the user requested price, send an offer to the user to purchase the item at the user requested price.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
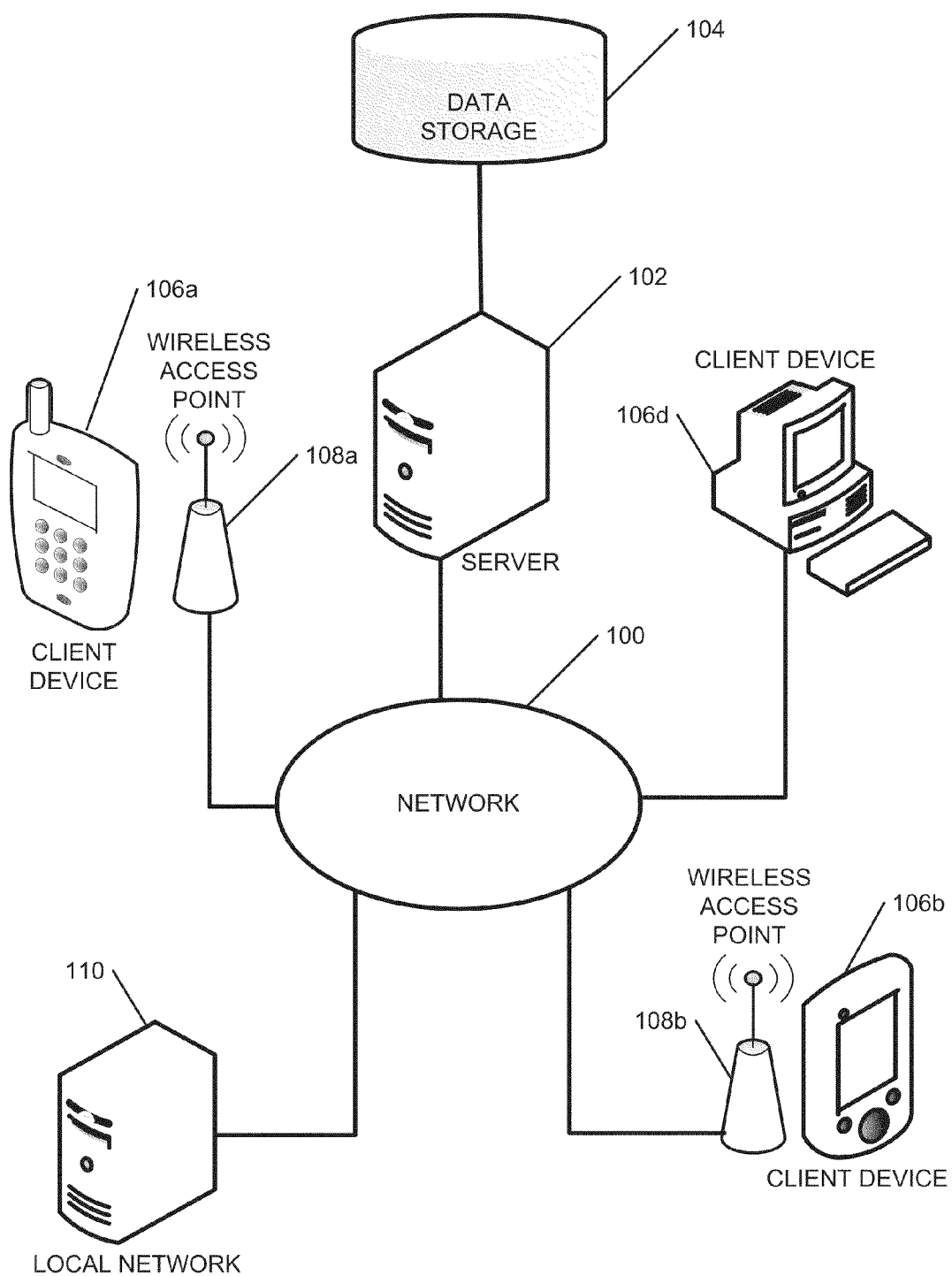
FIG. 1 is a functional diagram of an exemplary communications network environment.

FIG. 1 is a functional diagram of an exemplary communications network environment. As illustrated, a plurality of users may be connected via an external network such as communications network 100. A communications network 100 can include, for example, the Internet, a Wi-Fi® network (IEEE 802.11 compatible), a Wi-Max network (IEEE 802.16 compatible), a Public Switched Telephone Network (PSTN), a cellular communications network and/or other communications mediums. The users may access the communications network 100 via a client device 106a (via a wireless access point 108a), via a client device 106b (via a wireless access point 108b), via a client device 106d, and/or via a local network 110. The client devices 106a, 106b, and 106d may include, for example, portable communication devices 106a and 106b, a personal computer 106d (as discussed in more detail below), and/or other communication devices. It should be appreciated that while the network 100, the client devices 106a, 106b, 106d, and connections illustrated in FIG. 1 are shown by way of example, this disclosure is not limited to these examples. The disclosure may be applicable to any client device, connection, and network that supports voice, data, and/or other types of communications. Additionally included in this nonlimiting example is a server 102 that is coupled to a data storage 104.

Depending on the type of communication desired, different functionality may be utilized. More specifically, while the client devices 106a and 106b may be configured to facilitate voice communications over a cellular network and/or a PSTN, they may also be configured for data communications via the Internet. Additionally, the client devices 106a and 106b may also be configured to facilitate communications via a Wi-Fi® network and/or a Wi-Max network. As a nonlimiting example, if a user operating the client device 106a wishes to make a cellular communication, the user can input the address (e.g., telephone number) of the callee device. This address can be sent to the wireless access point 108a (which may include a cellular antenna and/or other component), configured to send the communication request to the network 100. The network 100 may employ one or more cellular networks, PSTNs and/or other networks for facilitating the communication. Upon connecting the client device 106a with the callee device, communication may begin.

Similarly, if a user operating the client device 106b wishes to access a website (and/or other data associated with the Internet), the user can send a communication request, which may include an address, such as a Uniform Resource Locator (URL). The request can be sent to the desired computing device (such as the server 102 and/or the data storage 104) via the network 100, which may include the Internet, a Wi-Max network and/or a Wi-Fi® network. The desired computing device can then respond by sending the requested data to the client device 106b via the same (or similar) transmission mediums.

Additionally included in FIG. 1 is a local network 110, which may also be coupled to the network 100. The local network 110 can include one or more components for facilitating communications within the local network 110, as well as communications via the network 100.

Figure 2:
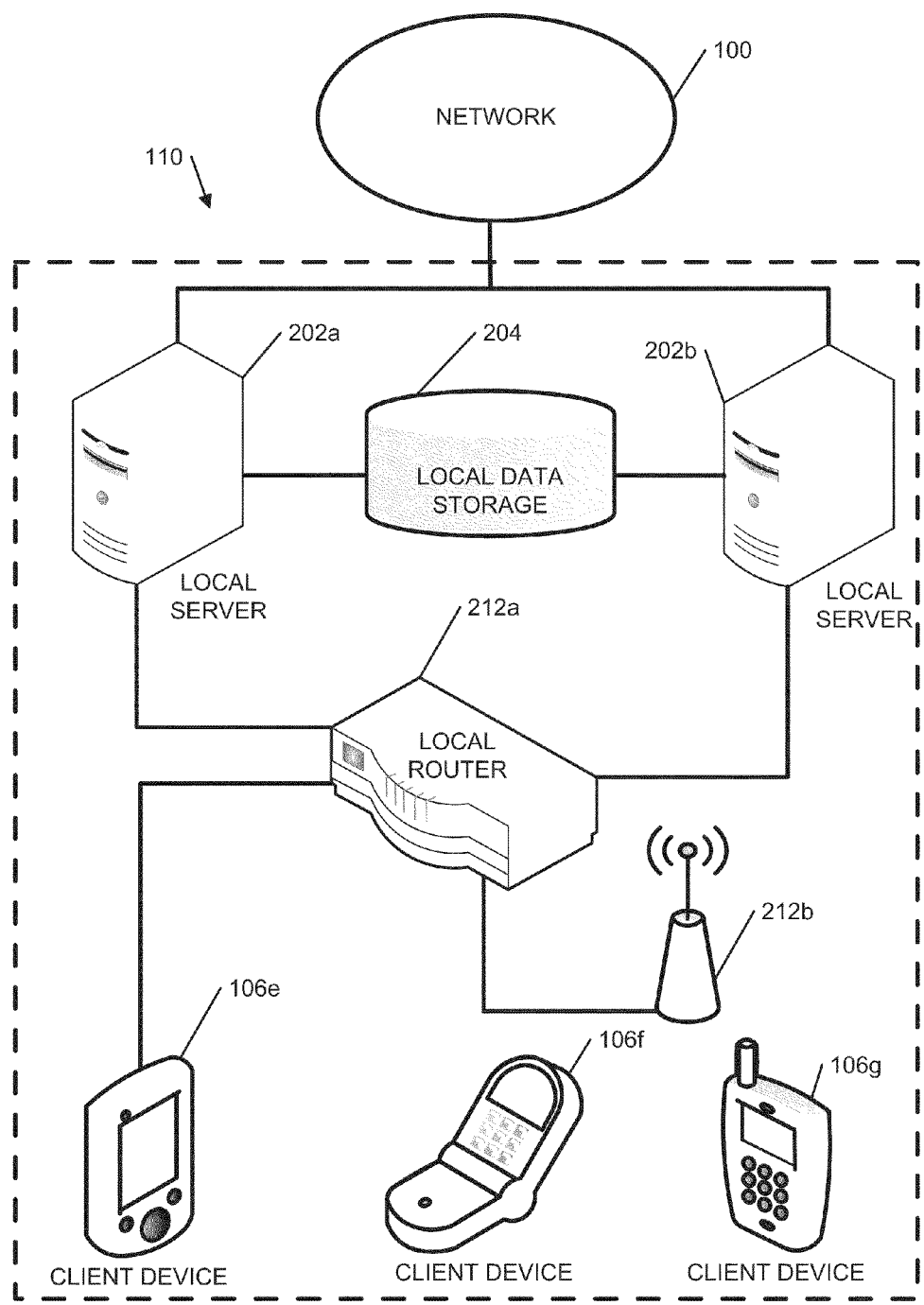
FIG. 2 is a functional diagram of an exemplary local network environment by which a user can communicate, similar to the environment from FIG. 1.

FIG. 2 is a functional diagram of an exemplary local network environment by which a user can communicate, similar to the environment from FIG. 1. The local network environment of FIG. 2 can be a home network, a business network and/or other network configured to facilitate communication of data. As illustrated, client devices 106e, 106f, 106g are coupled to a local router 212a. Depending on the particular configuration, this coupling may be wire-line or wireless. More specifically, as illustrated, the local router 212a may include (and/or may be coupled to) a wireless access point 212b. Depending on the particular configuration, the client devices 106e, 106f, 106g may be physically coupled to the local router 212a (e.g., the client device 106e) and/or wirelessly coupled to the local router 212a via the wireless access point 212b (e.g., the client devices 106f and 106g).

In addition, the local router 212a is also coupled to a local server 202a and a local server 202b. The local servers 202a, 202b (collectively referred to as local servers 202) are coupled to a local data storage 204. The local servers 202 are also coupled to an external network, such as the communications network 100.

In this exemplary networking environment a user located at the client device 106e may desire to communicate with a recipient located at the client device 106g. In the networking environment of FIG. 2, the user at the client device 106e can facilitate a communication with the client device 106g. The data (which may include voice, video, images, and/or other data) can then be sent from the client device 106e to the local router 212a. The local router 212a can then send the communication data to one (or more) of the local servers 202. The local servers 202 can then communicate the message back through the local router 212a to the intended recipient located at the client device 106g.

Similarly, the client devices 106e, 106f, 106g may also be configured to communicate with the local servers 202. Depending on the particular configuration, the local servers 202 (potentially with the assistance of the local data storage 204) may be configured with data that a user of one or more of the client devices 106e, 106f, 106g may find useful. In such a scenario, data may be communicated to and from one or more of the client devices 106e, 106f, 106g and the local servers 202 without utilization of the communications network 100.

As the nonlimiting example of FIG. 2 illustrates, data can be sent internal to the local network 110, without the use of an external network, such as the network 100. Additionally, while the configuration of FIG. 2 facilitates intra-network communications, such a configuration could also facilitate inter-network communications, similar to the configuration from FIG. 1. In such a scenario, a user operating one of more of the client devices 106e, 106f, 106g can send data to and receive data from a client device, such as one or more of the client devices 106a, 106b, 106d and/or computing device that is not located within the local network 110 of FIG. 2 via one or more of the client devices 106e, 106f, 106g. The data can be sent through the local router 212a to one or more of the local servers 202. From the local servers 202, the data can be sent to an external network, such as the network 100.

Referring back to FIG. 1, the data can then be sent from the local network 110 to the server 102, and then back through the network 100 to one or more of the client devices 106a, 106b, 106d. The user that is operating one or more of the client devices 106a, 106b, 106d can then reply through the same channels. More specifically, the reply data can be sent from the one or more client devices 106a, 106b, 106c through the network 100 to the server 102. The communication can then be sent back through network 100, to the local network 110 (to FIG. 2), to one or more of the local servers 202, through the local router 212a, and back to the user at client device 106, 106f, 106g.

One should note that the configuration of FIG. 2 is a non-limiting example. Components can be added or removed (or both) without diverging from the scope of this disclosure. Additionally, while some communications may use the communications network 100, others may not. More specifically, two users that are engaged in a communications session on the same local network 110 may not require the use of the network 100 to facilitate the communication. As the local network 110 can link a user to network 100, two users operating on the same local network 110 may simply use the local network 110 to facilitate the communication. In such a scenario, the configuration of FIG. 2 becomes more applicable, even for users who are not otherwise related.

Figure 3:
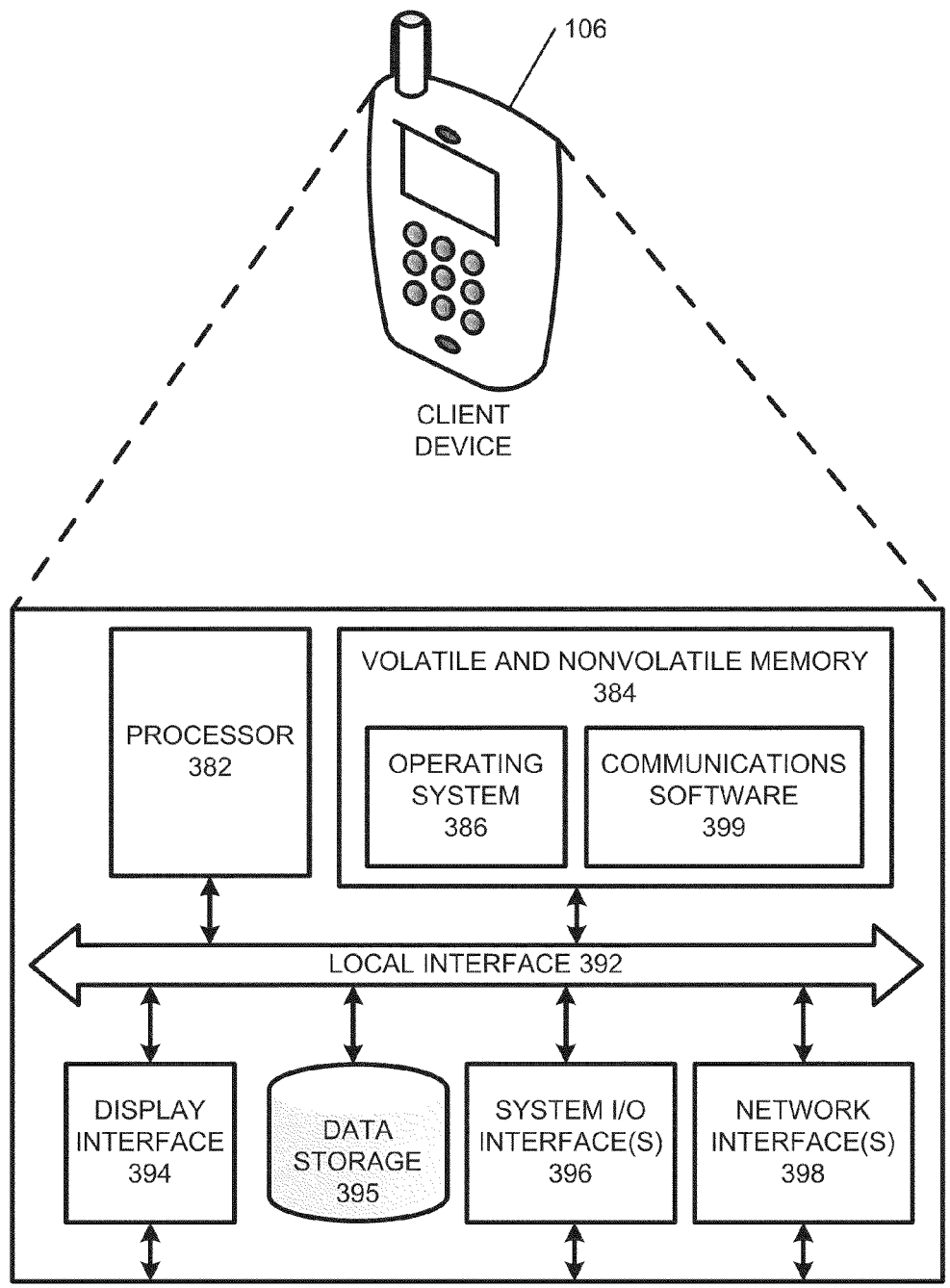
FIG. 3 is a functional diagram illustrating an exemplary embodiment of a client device that may be configured to communicate via a communications network such as the networks from FIGS. 1 and 2.

FIG. 3 is a functional diagram illustrating an exemplary embodiment of a client device 106 that may be configured to communicate via a communications network such as the networks 100, 110 from FIGS. 1 and 2, respectively. Although a wireless client device is illustrated, such as a mobile telephone, a portable telephone, a wireless personal computer, a PDA, a BLACKBERRY client device, an IPOD device, etc., one should note that this discussion can relate to wire-line devices, as well. Generally, in terms of hardware architecture, as shown in FIG. 3, the client device 106 includes a processor 382, volatile and nonvolatile memory 384, a display interface 394, a data storage 395, one or more input and/or output (I/O) device interface(s) 396, and/or one or more network interfaces 398 that are communicatively coupled via a local interface 392. The local interface 392 can include, for example but not limited to, one or more buses or other wired or wireless connections. The local interface 392 may have additional elements, which are omitted for simplicity, such as controllers, buffers (caches), drivers, repeaters, and receivers to enable communications. Further, the local interface 392 may include address, control, and/or data connections to enable appropriate communications among the aforementioned components. The processor 382 may be a hardware device for executing software, particularly software stored in the volatile and nonvolatile memory 384.

The processor 382 can be any custom made or commercially available processor, a central processing unit (CPU), an auxiliary processor among several processors associated with the client device 106, a semiconductor based microprocessor (in the form of a microchip or chip set), a macroprocessor, or generally any device for executing software instructions.

The volatile and nonvolatile memory 384 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 384 may incorporate electronic, magnetic, optical, and/or other types of storage media. One should note that the volatile and nonvolatile memory 384 can have a distributed architecture (where various components are situated remote from one another), but can be accessed by the processor 382. Additionally the volatile and nonvolatile memory 384 can include software such as, but not limited to, communications software 399 and an operating system 386.

The software in the volatile and nonvolatile memory 384 may include one or more separate programs, each of which includes an ordered listing of executable instructions for implementing logical functions. In the example of FIG. 3, the software in the volatile and nonvolatile memory 384 may include the communications software 399 (which can include instant messaging software, email software, web browsing software, telephony software, etc. in one or more separate software packages), as well as the operating system 386. The operating system 386 can be configured to control execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 384, so as to operate properly in connection with the operating system 386.

The Input/Output devices that may be coupled to the system I/O Interface(s) 396 may include input devices, for example but not limited to, a keyboard, mouse, scanner, bar code reader, Radio Frequency Identification (RFID) reader, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are the one or more network interfaces 398 for facilitating communication with one or more other devices. More specifically, the network interface 398 may include one or more components configured to facilitate a connection with another device. While in some embodiments, among others, the client device 106 can include a network interface 398 that includes a Personal Computer Memory Card International Association (PCMCIA) card (also abbreviated as "PC card") for receiving a wireless network card, it should be understood that this is a nonlimiting example. Other configurations can include the communications hardware within the computing device, such that a wireless network card is unnecessary for communicating wirelessly. Similarly, other embodiments include the network interfaces 398 for communicating via a wired connection. Such interfaces may be configured with Universal Serial Bus (USB) interfaces, serial ports, and/or other interfaces.

If the client device 106 is a personal computer, workstation, or the like, the software in the volatile and nonvolatile memory 384 may further include a basic input output system (BIOS) (omitted for simplicity). The BIOS is a set of software routines that initialize and test hardware at startup, start the operating system 386, and support the transfer of data among the hardware devices. The BIOS is stored in ROM so that the BIOS can be executed when the client device 106 is activated.

When the client device 106 is in operation, the processor 382 may be configured to execute software stored within the volatile and nonvolatile memory 384, to communicate data to and from the volatile and nonvolatile memory 384, and to generally control operations of the client device 106 pursuant to the software. Software in memory, in whole or in part, may be read by the processor 382, perhaps buffered within the processor 382, and then executed.

Figure 4:
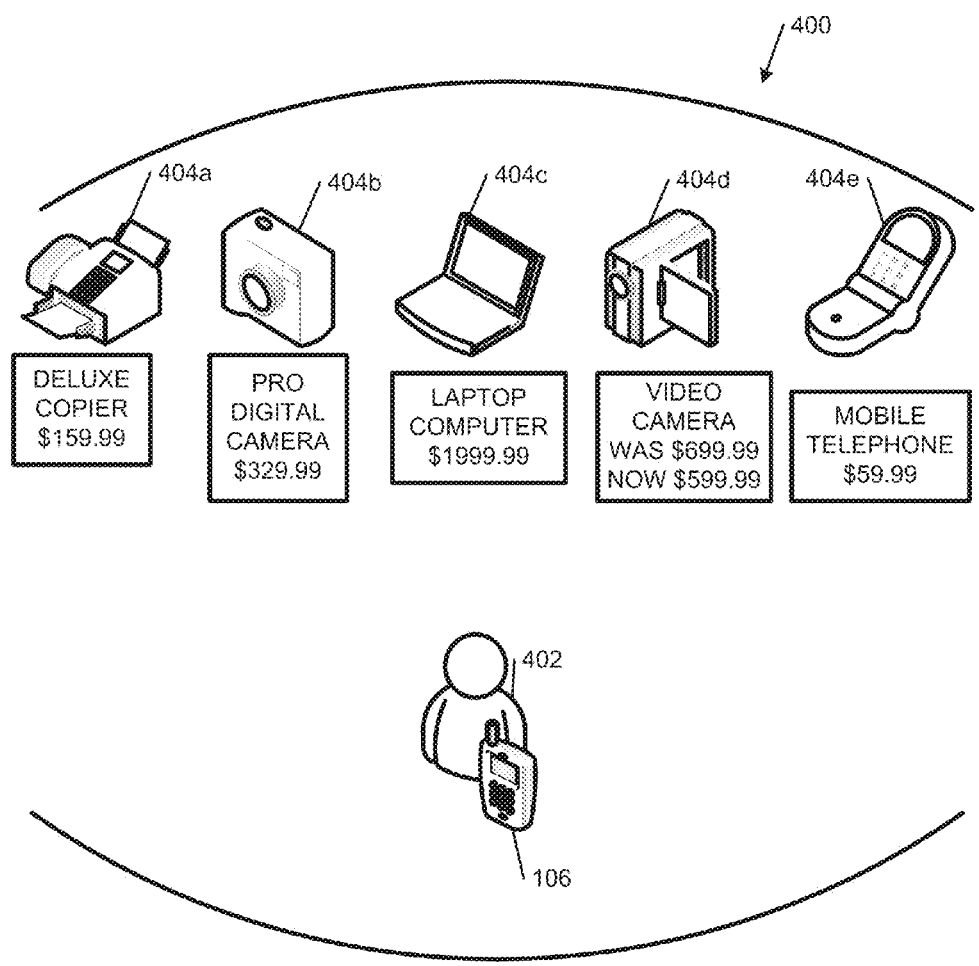
FIG. 4 is an exemplary embodiment with a user searching for goods in an environment with a client device, such as the client device from FIG. 3.

FIG. 4 is an exemplary embodiment of a user searching for goods in an environment with a client device, such as the client device 106 from FIG. 3. More specifically, as illustrated in the nonlimiting example of FIG. 4, a user 402 may enter an environment 400, such as a retail establishment. The environment 400 may include a plurality of goods 404a-404e, which may be offered for sale. It should be appreciated that the environment 400 may also include a plurality of services and/or a combination of goods and services that are offered for sale. Historically, the user 402 has been constrained to either accept the listed price for the desired goods and/or services or go to a different environment in search for a better price. However, in this nonlimiting example, the user 402 can input data via the client device 106 to determine an acceptable price for the goods. More specifically, in at least one embodiment, the user can carry a mobile telephone, PDA, and/or other client device 106 configured for price requests. The client device 106 can be configured to receive data from a Universal Product Code (UPC), RFID, or other identifier associated with the desired product. The client device 106 can receive the product information, as well as the listed price of the item, which may be defined by the user. Additionally, the client device 106 can receive a requested price for the item. According to an exemplary embodiment, the requested price may be a price that the user 406 of the client device 106 prefers to pay for the item.

As a nonlimiting example, if the user 402 is interested in purchasing the Pro Digital Camera 404b, the user can capture product information on the client device 106. The data captured by the client device 106 can include the name, model number, serial number, etc., as well as the $329.99 price listed for the Pro Digital Camera 404b in this environment 400. The client device 106 can also receive a requested price from the user 402 (e.g., a price the user would be willing to pay for the item). If the user 402 decides that he/she would purchase the item if listed for $189.99, the user can input $189.99 into the client device 106. Accordingly to exemplary embodiments, the user 402 may provide a requested price by selecting buttons associated with the client device 106, touching a display associated with the client device 106, speaking into a speaker associated with the client device 106, and/or other means for providing a requested price to client device 106.

Upon receiving this data, the client device 106 can send the data to a server associated with the environment 400 and/or to a third party. More specifically, in at least one embodiment, the client device 106 can send the data to a local server, such as the local server 202a or the local server 202b (FIG. 2). The local server 202a and/or the local server 202b can be a server associated with environment 400, however this is not a requirement. The local server 202a and/or the local server 202b can receive the data and can facilitate a determination of whether the requested price is acceptable for sale (e.g., whether the seller would be willing to sell the item for the requested price). If the requested price is acceptable, the user 402 may by provided the opportunity to purchase the item at the requested price.

If a determination is made that the requested price is not acceptable, the local server 202a and/or the local server 202b can send an indication to the client device 106. Similarly, some embodiments can provide that the local server 202a and/or the local server 202b forwards the item data to a third party, such as the server 102. The server 102 may have access to one or more sellers that sell the requested item. The server 102 can receive the item data (including requested price) from the local server 202a and/or the local server 202b and can determine whether other sellers would be willing to sell the item at the requested price.

If a seller agrees to sell the item at the requested price, the server 102 can connect the user 402 with that seller and/or facilitate the sale of that item. If the requested price is not acceptable to any seller, an indication can be sent to the user 402 via the client device 106 indicating that the price is not acceptable and/or the request can be queued for a subsequent determination.

While the nonlimiting example above included sending data from the client device 106 to the local server 202a and/or the local server 202b, this is a nonlimiting example. More specifically, at least one embodiment can be configured such that the item data and price request is sent to a third party without involvement of the local server 202a and/or the local server 202b. In such a configuration, the third party (which may be a seller of the item or an independent party) can contact sellers who carry the desired item. As discussed above, a determination can be made as to whether the requested price is acceptable to one or more sellers of the item.

One should note that while, in the embodiment of FIG. 4, the user 402 carries a client device 106, such as a mobile telephone, this is a nonlimiting example. More specifically, in at least one configuration, a computing device can be located in the environment 400 to facilitate communication of the desired data. Similarly, some configurations can provide that the user 402 inputs product data and/or price data from a location that is remote from the environment 400, such as a home/office personal computer and/or from a wireless device such as the client device 106 while the user is remotely situated from the environment 400.

Figure 5:
FIG. 5 is an exemplary display for requesting a price for goods and/or services, such as the goods from FIG. 4.

FIG. 5 is an exemplary display that may be provided to a user of a client device for requesting a price for goods and/or services, such as the goods 404a-404e, from FIG. 4. More specifically, a display 570 can include one or more options to allow users and/or sellers to view goods and/or services for sale. More specifically, "users" option 572 can provide options for a user to view, modify, and/or add products of interest. Sellers can view their products via "sellers" option 576, to determine whether users are interested and/or at what price their interest begins. Upon selection of one or more of the options 572, 576, the user and/or seller can be authenticated via a USERID and password and/or other authentication techniques, such as biometric authentication, among others.

Figure 6:
FIG. 6 is an exemplary display for providing a user option to determine a requested price for goods and/or services, similar to the display from FIG. 5.

FIG. 6 is an exemplary display for providing a user option to determine a requested price for goods and/or services, similar to the display from FIG. 5. More specifically, in response to selection of the "users" option 572, a display 670 can be provided. The display 670 can include a plurality of options including options related to various categories of goods or services. The nonlimiting example of FIG. 6 includes categories that include an electronics 672a, a home and garden category 672b, an automobiles category 672c, and an others category 672d.

Also included in the nonlimiting example of FIG. 6 is a listing of products that a user has selected from an environment. More specifically, referring to FIG. 4, the user 402 has selected (and submitted data for) the Pro Digital Camera 404b and the Deluxe Copier 404a. As illustrated in FIG. 4, the Pro Digital Camera 404b has a listed price of $329.99. The user 402 has indicated that he/she is willing to pay $189.99 for the camera. Similarly, the Deluxe Copier 404a has a listed price of $159.99 and the user 402 has indicated that he/she is willing to pay 149.99 for the item.

Additionally, the display 670 includes an "add items" option 674a that can allow the user to add one or more items to the display 670. Also included is a "remove items" option 674b. An "edit items" option 674c is also included for allowing the user to edit the requested price for an item. An "options" option 674d is provided for further configuring user settings.

Figure 7:
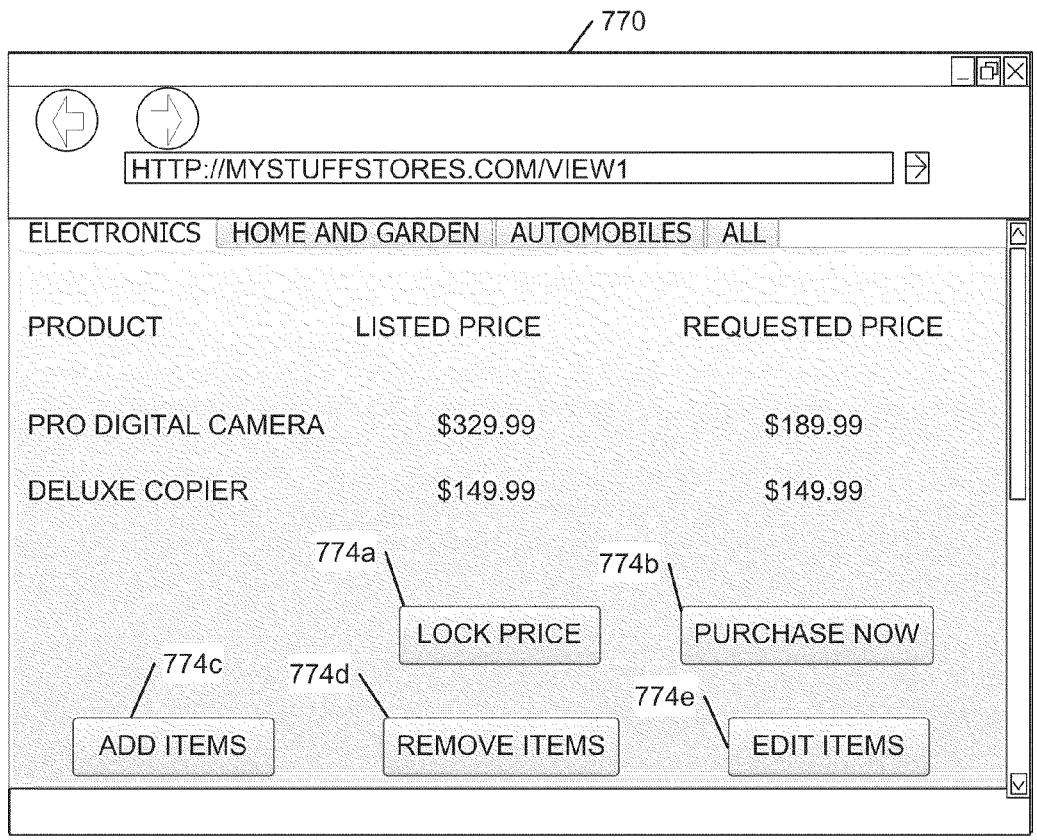
FIG. 7 is an exemplary display illustrating a plurality of options that may be provided to a user upon receiving a match to a requested price, similar to the display from FIG. 6.

FIG. 7 is an exemplary display illustrating a plurality of options that may be provided to a user upon receiving a match to a requested price, similar to the display from FIG. 6. More specifically, in the nonlimiting example of FIG. 7, the listed price for the Deluxe Copier 404a in a display 770 matches the requested price. This can occur when the third party finds a seller that is willing to sell the item at the requested price, when a seller changes the listed price, when the seller changes the price for this user, etc. Since the listed price and the requested price match, the user 402 can be provided with a "lock price" option 774a and a "purchase now" option 774b. The "lock price" option 774a can lock the agreed price for this particular user for a predetermined amount of time. The user can continue to search for a lower price, while maintaining the ability to purchase this item from this seller at the "locked" price. Similarly, the "purchase now" option 774b can allow the user to purchase the item now at the agreed upon price. The purchase can include an Internet transaction, however this is not a requirement. Also included in the nonlimiting example of FIG. 7 are "add items" option 774c, "remove items" option 774d, and an "edit items" option 774e.

Figure 8:
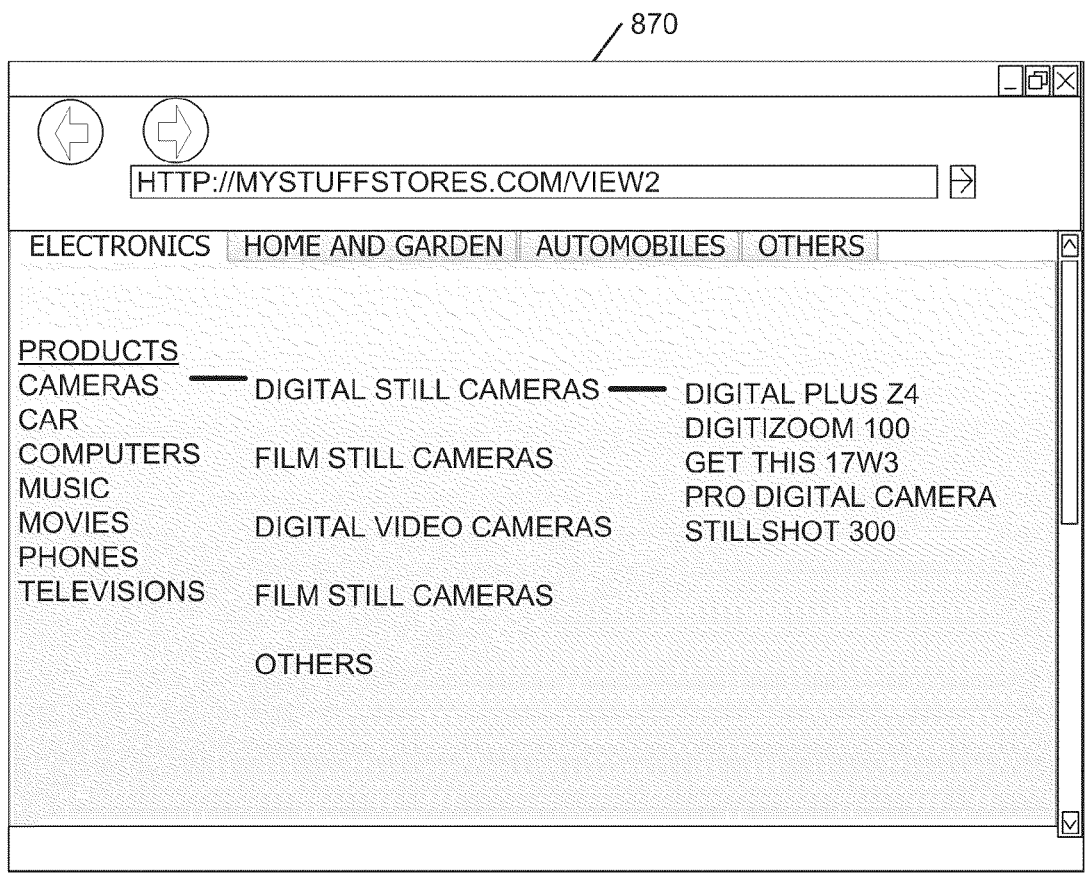
FIG. 8 is an exemplary display illustrating an embodiment of a search option for adding an item to the display of FIGS. 6 and 7.

FIG. 8 is an exemplary display illustrating an embodiment of a search option for adding an item to the display of FIGS. 6 and 7. More specifically, upon selection of the "add items" option 674a, 774c, display 870 can be provided to the user. The display 870 can include a plurality of options for searching for a desired item. In the nonlimiting example of FIG. 8, under the electronics tab, various types of products may be displayed. By selecting "cameras," a plurality of different types of cameras may be displayed. By selecting "digital still cameras" a plurality of digital still cameras may be displayed. The user can then select the desired item to view the listed price, enter a requested price, and/or perform other actions as will be further discussed in view of FIG. 10.

One should note that, depending on the particular configuration, selection of an item in the display 870 may result in any of a plurality of different scenarios. More specifically, in at least one embodiment, the user can be presented with a list of one or more sellers who sell the product, as well as a listed price associated with the at least one seller. The user can enter a requested price, which can be sent to the at least one seller, as discussed above.

Additionally, some embodiments can provide the user with, upon selection of the desired item, links to sellers of that item. The user can then select one or more of the links to view the item at that seller's website. The link may provide the user with the ability to request a price and/or the user's web browsing software may include (or be utilized with) a toolbar for performing this action.

Figure 9:
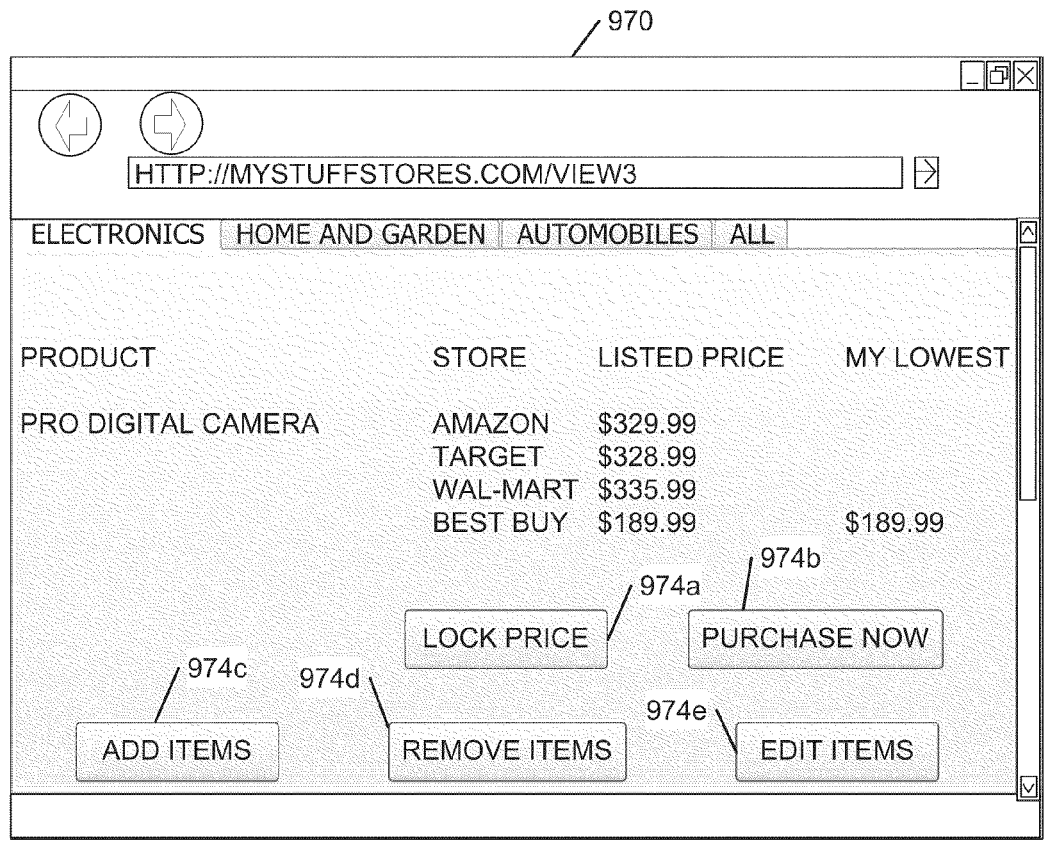
FIG. 9 is an exemplary display illustrating a plurality of options that may be provided to a user upon receiving price data associated with a plurality of sellers, similar to the display from FIG. 8.

FIG. 9 is an exemplary display illustrating a plurality of options that may be provided to a user upon receiving price data associated with a plurality of sellers, similar to the display from FIG. 8. As illustrated in the nonlimiting example of FIG. 9, in response to selection of the Pro Digital Camera, a display 970 may be provided to the user. The display 970 can include a listing of sellers that sell the selected item, as well as the price at which the product is listed. Additionally displayed is the user's requested price for the item. Since the requested price matches (or is higher than) at least one of the listed prices, the user is provided with a "lock price" option 974a, a "purchase now" option 974b, an "add items" option 974c, a "remove items" option 974d, and an "edit items" option 974e.

Figure 10:
FIG. 10 is an exemplary display illustrating an embodiment of a price request option for adding an item to the display of FIGS. 6 and 7.

FIG. 10 is an exemplary display illustrating an embodiment of a price request option for adding an item to the display of FIGS. 6 and 7. As discussed above, display 1070 can be provided to a user after a selection of an item from the display 870 and/or may be accessed via normal Internet browsing. As illustrated, the display 1070 may be provided with a request toolbar 1072 for submitting price requests to any of a plurality of items. The request toolbar 1072 can include a text prompt 1074 and a "request" option 1076 for entering a desired price. Upon entering a desired price in text prompt 1074 and selecting the "request" option 1076, a request for the item displayed can be sent to the seller directly and/or to a third party as discussed above.

Figure 11:
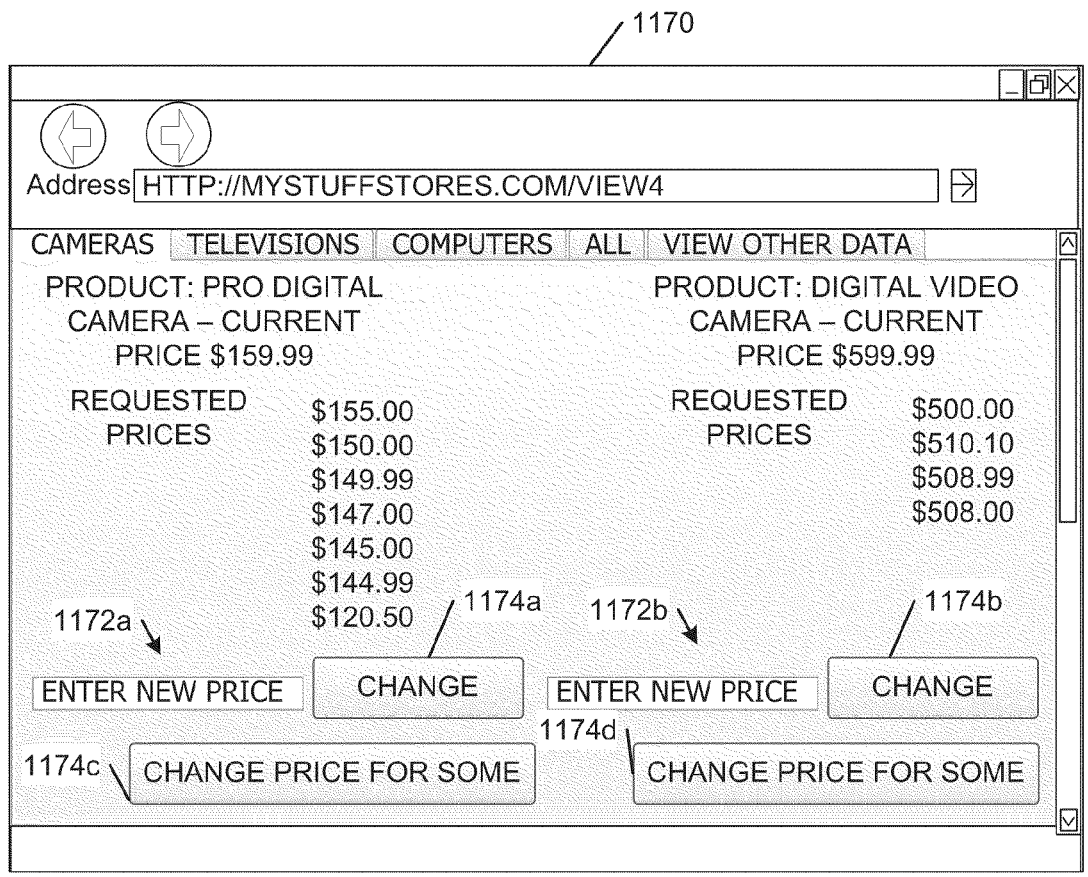
FIG. 11 is an exemplary display illustrating a plurality of requested prices that may be presented to a seller, similar to the display from FIG. 5.

FIG. 11 is an exemplary display illustrating a plurality of requested prices that may be presented to a seller, similar to the display 570 from FIG. 5. As illustrated in the nonlimiting example of FIG. 11, upon selection of the "sellers" option 576 (FIG. 5), a display 1170 can be provided to a user. The display 1170 can include a listing of one or more items in any of a plurality of different categories, as well as a listed price for those items. Also included in the display 1170 is a listing of requested prices for those items. The requested prices can be received via the client device 106 from one or more users.

More specifically, illustrated in FIG. 11, the Pro Digital Camera 404b has received price requests between the prices of $155.00 and $120.50. From this information, a seller can determine at what price most users would purchase this item.

Additionally included in the display 1170 are "enter new price" text prompts 1172a, 1172b and "change" options 1174a, 1174b. More specifically, if the seller determines that one or more of the listed items could be sold more easily at a different price, thereby generating more revenue, the seller can change the listed price of that item. Upon changing the price of an item, an alert can be sent to at least a portion of those users who submitted a requested price. The alert may be provided to one or more of the users who submitted a requested price through client devices 106 associated with the users 402. While in some embodiments the alert can be sent to all users who submitted a price request (on this item or other items), other embodiments can send an alert only to those users whose price request is roughly the same or more than the newly listed price. Other embodiments can provide that no alerts are sent.

Also included in the display 1170 are "change price for some" options 1174c, 1174d. More specifically, as discussed below, the seller can have the option of offering a lower price to at least a portion of the potential purchasers of an item.

Figure 12:
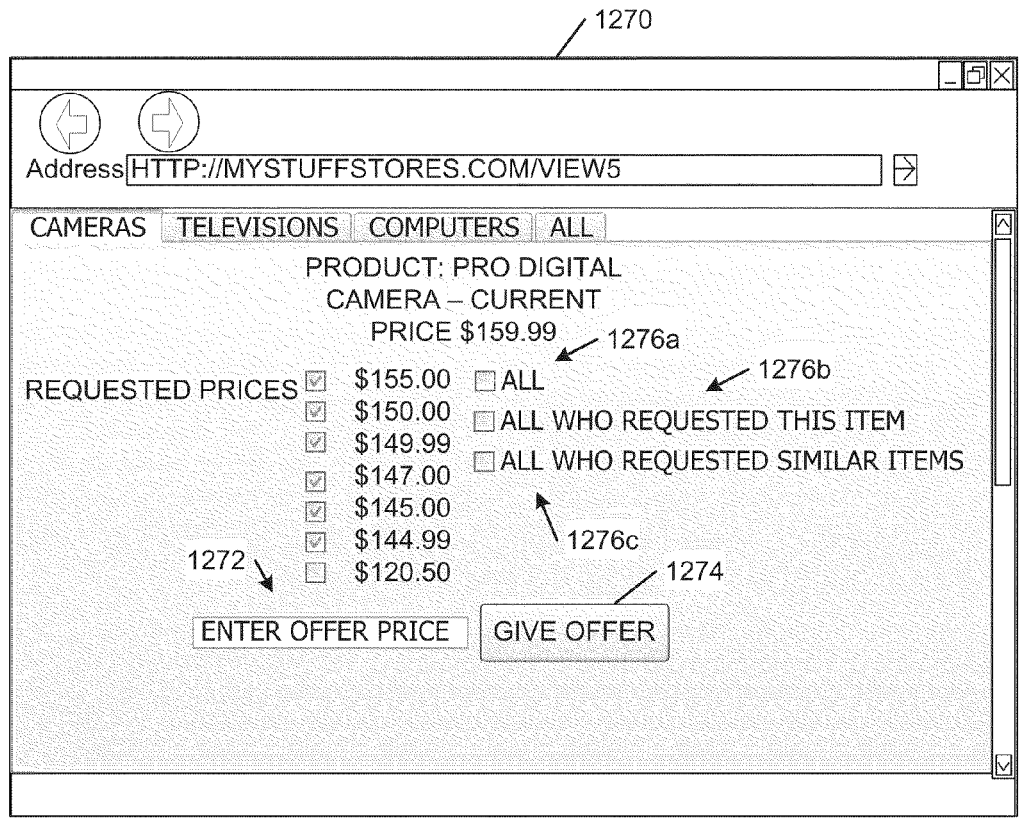
FIG. 12 is an exemplary display illustrating an option to offer one or more goods and/or services at a price that is different from an advertised price, similar to the display from FIG. 11.

FIG. 12 is an exemplary display illustrating an option to offer one or more goods and/or services at a price that is different from an advertised price, similar to the display 1170 from FIG. 11. As illustrated in the nonlimiting example of FIG. 12, a user may access a display 1270 by selecting the "change price for some" option 1174c (FIG. 11). The display 1270 provides options for a seller to determine which users to offer a new price. More specifically, the display 1270 includes options for a seller to select from those users who requested a price for the Pro Digital Camera 404b. The seller can select one or more of the users and enter a price to send to those users in a text prompt 1272 of the display 1270. The seller can select a "give offer" option 1274 to send the new price to the selected users.

Additionally included in the display 1270 are an "all" option 1276a, an "all who requested this item" option 1276b, and "all who requested similar items" option 1276c. The "all" option 1276a can allow the seller to send the new price offer to all users that have previously submitted price requests on any other item (or are otherwise associated with server the 102 or local server 202a and/or 202b). The "all who requested this item" option 1726b can allow a seller to send the new price offer to all users who previously sent a price request, whether listed in the display 1270 or not. The "all who requested similar items" option 1276c provides a seller with the ability to send the new price offer to all users who have submitted a price request for other similar items.

One should note that at least one embodiment can provide an option for a seller to submit a "lowest listed price." The "lowest listed price" can include a price that, although not offered to all users, can be offered in some situations. As a nonlimiting example, referring to FIG. 12, a seller can also be provided with a "lowest listed price" option (not shown) that can be applied to all users who submitted price requests. If the seller enters a "lowest listed price" of $145.00, all users who submitted price requests at or above $145.00 would each be offered the item at the user's requested price.

Figure 13:
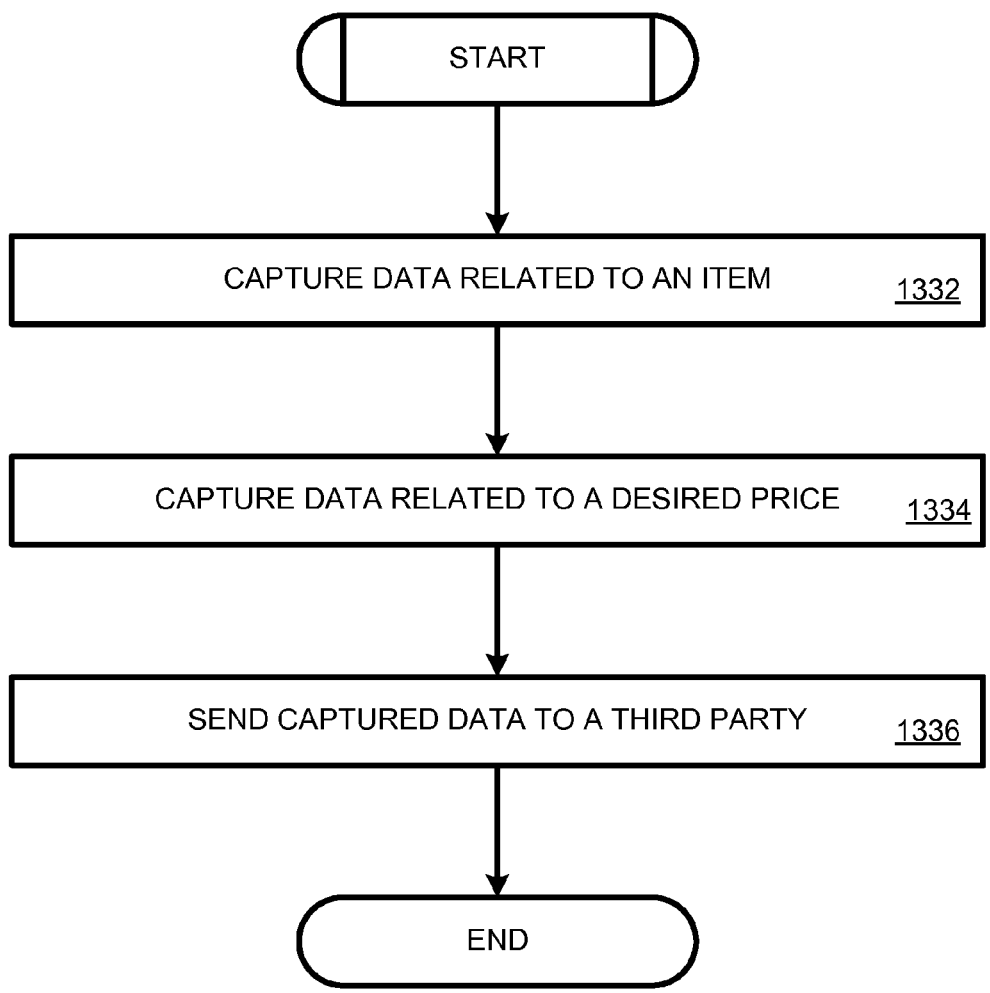
FIG. 13 is a flowchart illustrating an exemplary process that may be performed to capture data related to an item, such as an item from FIG. 4.

FIG. 13 is a flowchart illustrating an exemplary process that may be performed to capture data related to an item, such as one or more of the goods 404a-404e from FIG. 4. More specifically, as illustrated in the nonlimiting example of FIG. 13, the client device 106 can capture data related to an item (block 1332). As discussed above, the user can enter an environment and can capture product data at the client device 106 via a UPC reader, an RFID reader, manually inputting the data, or otherwise capturing the data. The data related to an item can include a product number, serial number, listed price of the item, and/or other data. The client device 106 can then capture data related to a desired price (block 1334) that a user of the client device would prefer to pay for the item. Again, the user can manually input the desired price or otherwise facilitate communication of a desired price to the client device 106. The client device 106 can then send the captured data to a third party and/or a seller of the item (block 1336). As discussed above, the data can be sent to any of a plurality of locations including, but not limited to the server 102 and/or the local server 202a and/or 202b.

Figure 14:
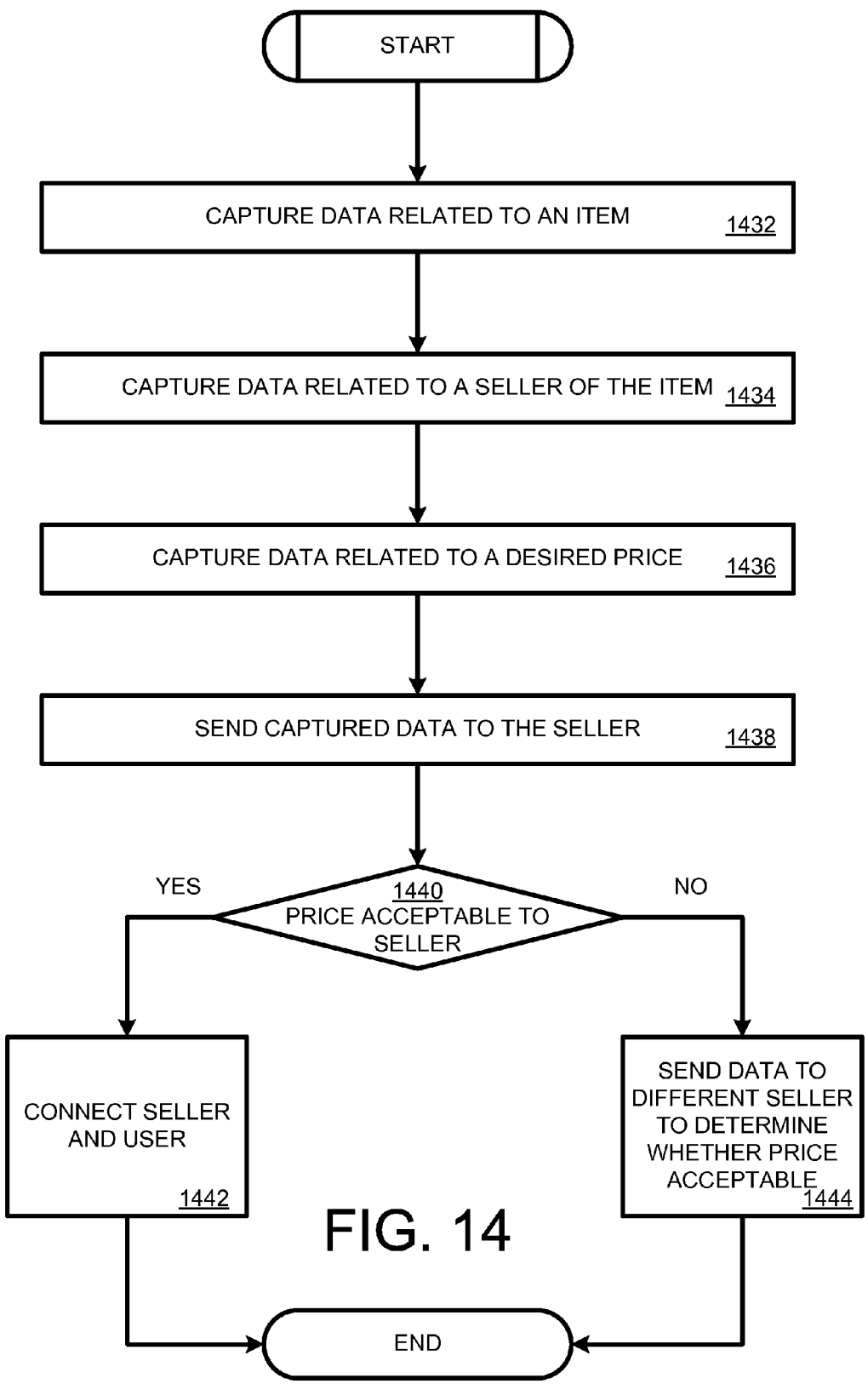
FIG. 14 is a flowchart illustrating an exemplary process that may be performed to provide a preferred seller a right of first refusal to a requested price, similar to the flowchart from FIG. 13.

FIG. 14 is a flowchart illustrating an exemplary process that may be performed to provide a preferred seller with a right of first refusal to a requested price, similar to the flowchart from FIG. 13. As illustrated in the nonlimiting example of FIG. 14, the server 102 (and/or the local server 202a and/or 202b) can capture data related to an item (block 1432). More specifically, in at least one embodiment, the data can be received via the client device 106. The server 102 (and/or the local server 202a and/or 202b) can then capture data related to a seller of the item (block 1434). More specifically, depending on the particular embodiment, the item data captured in block 1432 may include data related to the seller of the particular item. Other configurations may provide that the client device 106 is configured to determine a current location (via Global Positioning System or other location determination technology) and send this data to the server 102 (and/or the local server 202a and/or 202b). Other embodiments can provide that a user inputs this information.

The server 102 (and/or the local server 202a and/or 202b) can then capture data related to a desired price (block 1436). Again, this data may be input by a user at the client device 106 and sent by the client device 106 to the server 102 (and/or the local server 202a and/or 202b). The server 102 (and/or the local server 202a and/or 202b) can then send the captured data to one or more sellers of the item (block 1438). The server 102 (and/or the local server 202a and/or 202b) can then determine whether the requested price is acceptable to the seller (block 1440). If the price is acceptable, the server 102 (and/or the local server 202a and/or 202b) can connect the seller and user (block 1442). If, on the other hand, the price is not acceptable to the seller, the server 102 (and/or the local server 202a and/or 202b) can send data to a different seller of the item to determine whether that seller will accept the requested price (block 1444). If the price is not acceptable to any seller, the requested price and other user data can be stored for subsequent use.

Figure 15:
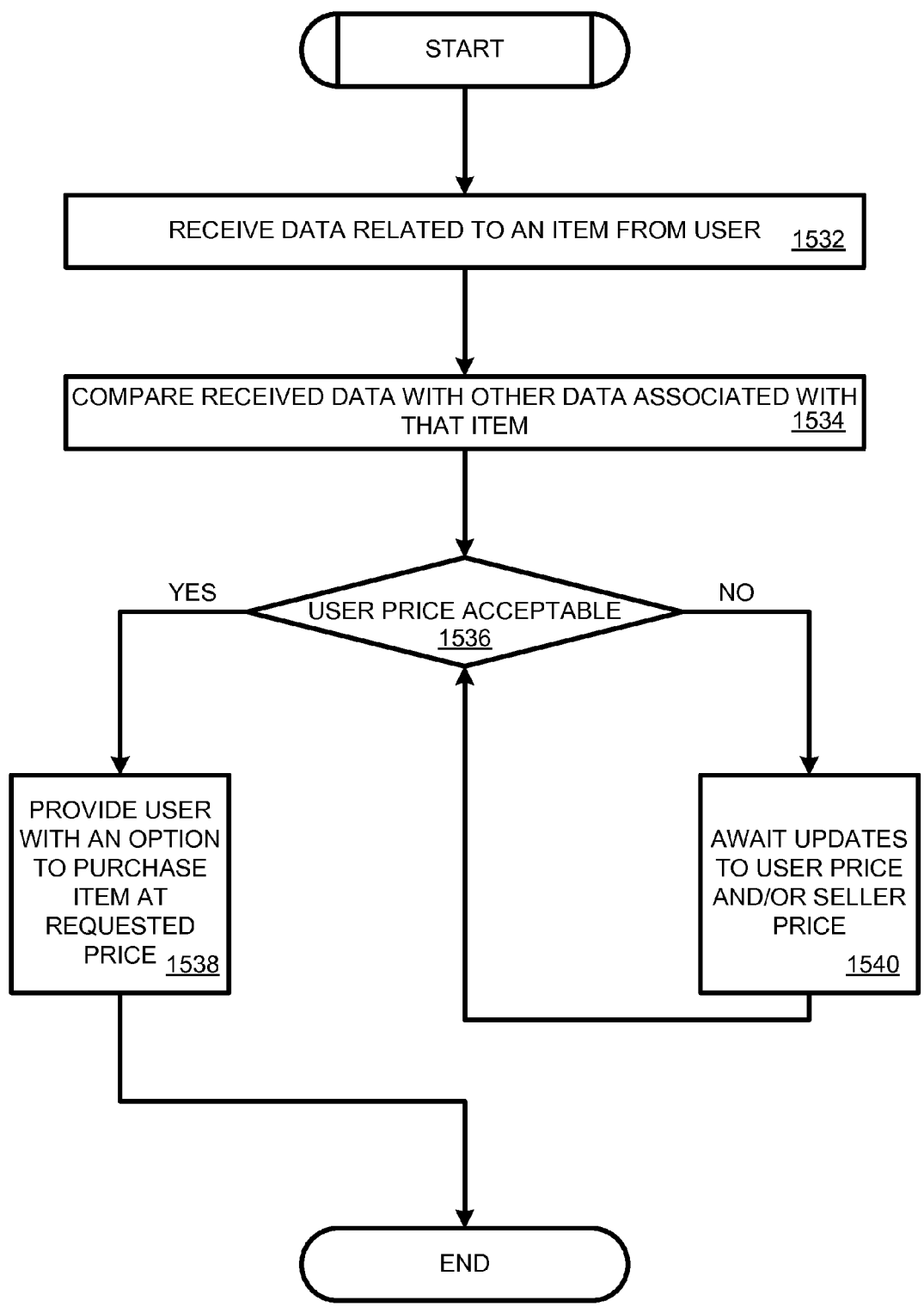
FIG. 15 is a flowchart illustrating an exemplary process that may be performed to determine whether a seller accepts a requested price from a user, similar to the flowchart from FIG. 14.

FIG. 15 is a flowchart illustrating an exemplary process that may be performed to determine whether a seller accepts a requested price from a user, similar to the flowchart from FIG. 14. As illustrated in the nonlimiting example of FIG. 15, the server 102 (and/or the local server 202a and/or 202b) can receive data related to an item from a user (block 1532). As discussed above, the data can include a product identifier, a seller identifier, a user requested price, and/or other information.

The server 102 (and/or the local server 202a and/or 202b) can then compare the received data with other data associated with the item (block 1534). Other data associated with the item can include a listed price associated with the item with one or more seller. The server 102 (and/or the local server 202a and/or 202b) can then determine whether the user price is acceptable (block 1536). If the price is not acceptable, the server 102 (and/or the local server 202a and/or 202b) can await updates to the user price and/or seller price (block 1540). If, on the other hand, the requested price is acceptable, the server 102 (and/or the local server 202a and/or 202b) can provide the user with an option to purchase the item at the requested price (block 1538).

Figure 16:
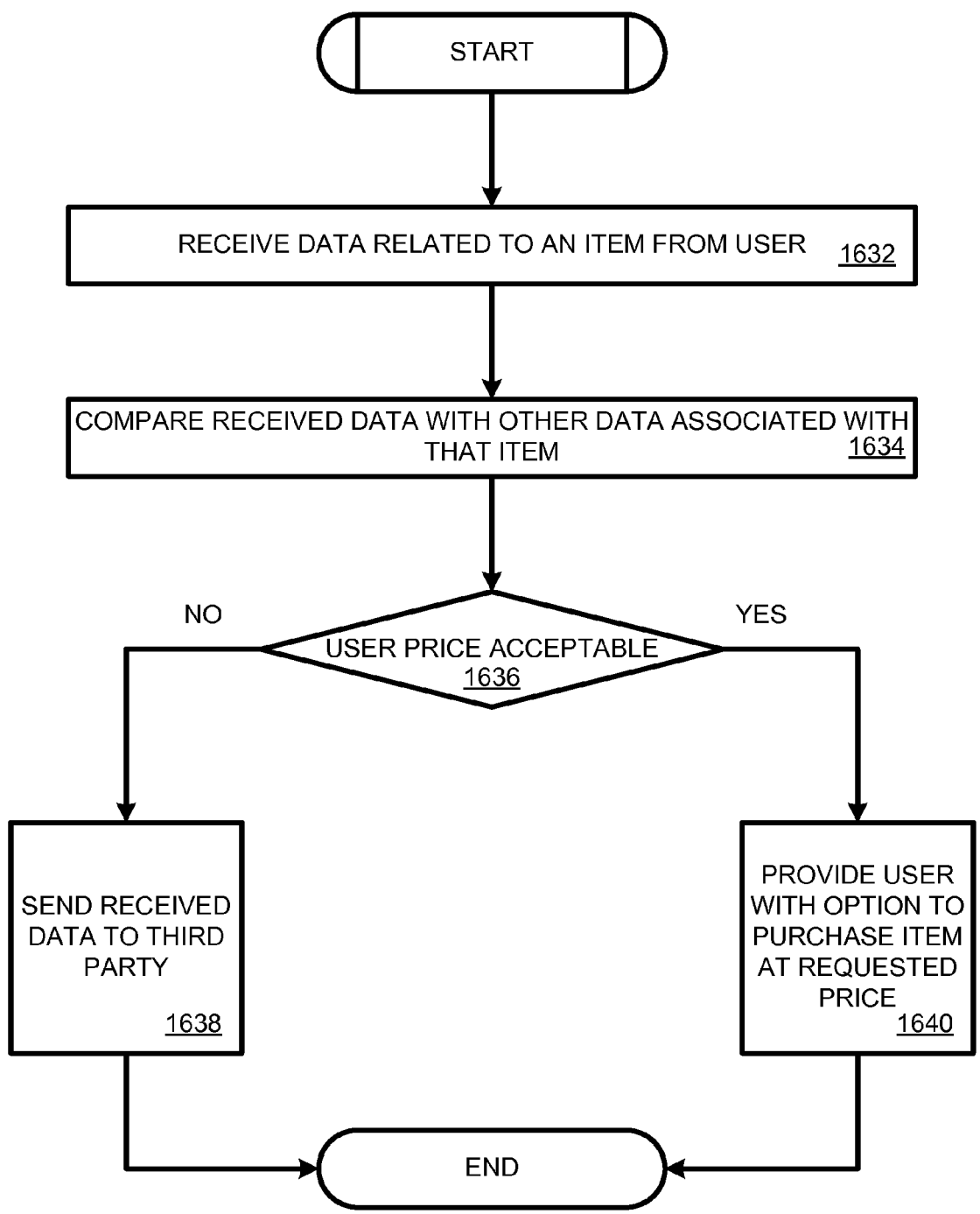
FIG. 16 is a flowchart illustrating an exemplary process that can be performed to determine whether a particular seller accepts a requested price, similar to the flowchart from FIG. 15.

FIG. 16 is a flowchart illustrating an exemplary process that can be performed to determine whether a particular seller accepts a requested price, similar to the flowchart from FIG. 15. As illustrated in the nonlimiting example of FIG. 16, the server 102 (and/or the local server 202a and/or 202b) can receive data related to an item from a user (block 1632). The server 102 (and/or the local server 202a and/or 202b) can then compare the received data with other data associated with the item (block 1634). The server 102 (and/or the local server 202a and/or 202b) can then determine whether the user price is acceptable (block 1636). If the user price is acceptable, the server 102 (and/or the local server 202a and/or 202b) can provide the user with the option to purchase the item at the requested price (block 1640). If the user price is not acceptable, the server 102 (and/or the local server 202a and/or 202b) can send the received data to a third party (block 1638). The third party can then contact other potential sellers with the user and item data to determine whether there is at least one other seller willing to sell the item at the requested price.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for personal data submission, comprising:
receiving, by a user processing device, data related to an item, the item being associated with a listed price, wherein the data is received by wirelessly scanning a product identifier associated with the item by the user processing device from a retail establishment and the item is being offered for sale at the retail establishment at the listed price;

receiving, by the user processing device, data related to a user requested price for the item, wherein the user requested price is less than the listed price;

transmitting, by the user processing device, a request to purchase the item at the user request price to a first seller of the item, wherein the first seller is not associated with the retail establishment;

in response to receiving an indication that the first seller accepts the user requested price, displaying a selectable offer to the user to purchase the item at the user requested price from the first seller; and in response to displaying the offer to the user to purchase the item at the user requested price, displaying an additional selectable option to the user to lock the user requested price for a subsequent purchase of the item.

2. The method of claim 1, further comprising in response to receiving an indication that the first seller does not accept the user requested price, automatically transmitting, by the user processing device, a second request to purchase the item at the user request price to a second seller of the item, wherein the second seller is not associated with the retail establishment.

3. The method of claim 1, further comprising providing an option to request that a seller affiliated with the retail establishment to change the listed price.

4. The method of claim 1, further comprising providing an option to the first seller to view a plurality of price requests associated with the item from a plurality of users.

5. The method of claim 1, further comprising, in response to displaying the offer to the user to purchase the item at the user requested price, providing an additional option to the user to purchase the item at the user requested price.

6. The method of claim 1, further comprising providing an option to the first seller to view a plurality of price requests associated with the item from a plurality of users; enter a new price for the item; and send offers to all users who submitted a price request at or above the new price to purchase the item at the user's requested price.

7. A system for personal data submission, comprising:
a processor;
a first receiving component configured to receive data related to an item, the item being associated with a listed price, wherein the data is received by wirelessly scanning a product identifier associated with the item from a retail establishment and the item is being offered for sale at the retail establishment at the listed price;
a second receiving component configured to receive data related to a user requested price for the item, wherein the user requested price is less than the listed price;
a first transmitting component configured to transmit a request to purchase the item at the user request price to a first seller of the item, wherein the first seller is not associated with the retail establishment; and
a displaying component configured to, in response to receiving an indication that the first seller accepts the user requested price, display a selectable offer to the user to purchase the item at the user requested price from the first seller, the displaying component further configured to in response to displaying the offer to the user to purchase the item at the user requested price, display an additional selectable option to the user to lock the user requested price for a subsequent purchase of the item.

8. The system of claim 7, further comprising a second transmitting component configured to, in response to receiving an indication that the first seller does not accept the user requested price, transmit a second request to purchase the item at the user request price to a second seller of the item, wherein the second seller is not associated with the retail establishment.

9. The system of claim 7, further comprising a providing component configured to provide an option to request that a seller affiliated with the retail establishment to change the listed price.

10. The system of claim 7, further comprising a providing component configured to provide an option to the first seller to view a plurality of price requests associated with the item from a plurality of users.

11. The system of claim 7, further comprising a providing component configured to, in response to displaying the offer to the user to purchase the item at the user requested price, provide an additional option to the user to purchase the item at the user requested price.

12. The system of claim 7, further comprising a providing component configured to provide an option to the first seller to view a plurality of price requests associated with the item from a plurality of users; enter a new price for the item; and send offers to all users who submitted a price request at or above the new price to purchase the item at the user's requested price.

13. A non-transitory computer readable medium for personal data submission, comprising:
first logic configured to receive data related to an item, the item being associated with a listed price, wherein the data is received by wirelessly scanning a product identifier associated with the item from a retail establishment and the item is being offered for sale at the retail establishment at the listed price;
second logic configured to receive data related to a user requested price for the item, wherein the user requested price is less than the listed price;
third logic configured to transmit a request to purchase the item at the user request price to a first seller of the item, wherein the first seller is not associated with the retail establishment;
fourth logic configured to, in response to receiving an indication that the first seller accepts the user requested price, display selectable option to the user to purchase the item at the user requested price from the first seller; and
fifth logic configured to, in response to displaying the offer to the user to purchase the item at the user requested price, display an additional selectable option to the user to lock the user requested price for subsequent purchase of the item.

14. The non-transitory computer readable medium of claim 13, further comprising sixth logic configured to, in response to receiving an indication that the first seller does not accept the user requested price, transmit a second request to purchase the item at the user request price to a second seller of the item, wherein the second seller is not associated with the retail establishment.

15. The non-transitory computer readable medium of claim 13, further comprising seventh logic configured to provide an option to request that a seller affiliated with the retail establishment change the listed price.

16. The non-transitory computer readable medium of claim 13, further comprising eighth logic configured to provide an option to the first seller to view a plurality of price requests associated with the item from a plurality of users.

17. The non-transitory computer readable medium of claim 13, further comprising ninth logic configured to, in response to displaying the offer to the user to purchase the item at the user requested price, provide an additional option to the user to purchase the item at the requested price.

* * * * *